(12) United States Patent
Tada et al.

(10) Patent No.: US 8,979,687 B2
(45) Date of Patent: Mar. 17, 2015

(54) TORQUE TRANSMISSION CHAIN AND TORQUE TRANSMISSION DEVICE

(75) Inventors: Seiji Tada, Kashiba (JP); Shigeo Kamamoto, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 387 days.

(21) Appl. No.: 13/391,135

(22) PCT Filed: Aug. 31, 2010

(86) PCT No.: PCT/JP2010/064795
§ 371 (c)(1),
(2), (4) Date: Feb. 17, 2012

(87) PCT Pub. No.: WO2011/027743
PCT Pub. Date: Mar. 10, 2011

(65) Prior Publication Data
US 2012/0149512 A1    Jun. 14, 2012

(30) Foreign Application Priority Data
Sep. 4, 2009 (JP) ................................. 2009-204518

(51) Int. Cl.
F16H 7/06 (2006.01)
F16G 13/18 (2006.01)
F16G 5/18 (2006.01)
F16H 9/16 (2006.01)

(52) U.S. Cl.
CPC ... *F16G 5/18* (2013.01); *F16H 9/16* (2013.01)
USPC ........................................................ 474/148

(58) Field of Classification Search
CPC .................................... F16G 5/18; F16G 9/16
USPC .......................................... 474/148, 215, 217
See application file for complete search history.

(56) References Cited

U.S. PATENT DOCUMENTS

| 6,695,731 B2 * | 2/2004 | Linnenbrugger et al. .... 474/215 |
| 7,179,184 B2 * | 2/2007 | Linnenbrugger et al. .... 474/215 |
| 7,306,532 B2 * | 12/2007 | Hubertus Maria van Rooij et al. ............................. 474/215 |

(Continued)

FOREIGN PATENT DOCUMENTS

| JP | A-61-218846 | 9/1986 |
| JP | A-2006-161911 | 6/2006 |

(Continued)

OTHER PUBLICATIONS

International Search Report mailed Dec. 7, 2010 issued in International Patent Application No. PCT/JP2010/064795 (with translation).

(Continued)

*Primary Examiner* — William E Dondero
*Assistant Examiner* — Mark K Buse
(74) *Attorney, Agent, or Firm* — Oliff PLC (57) ABSTRACT

A torque transmission chain and torque transmission device of which the strength of links is increased by devising lock points that regulate the maximum relative rotation angle between the links are provided. Lock points that contact with pins and interpieces to regulate the maximum relative rotation angles are provided at four portions, that is, a front surface of a link front pillar portion, a rear surface of a link rear pillar portion and a front surface and rear surface of a link intermediate pillar portion. Each of allowable maximum relative rotation angles regulated by the lock points of a link outline portion is set so as to be smaller than each of allowable maximum relative rotation angles regulated by the lock points of the link intermediate pillar portion.

4 Claims, 6 Drawing Sheets

(56) References Cited

U.S. PATENT DOCUMENTS

| | | | |
|---|---|---|---|
| 2001/0046917 A1* | 11/2001 | Linnenbrugger et al. | .... 474/215 |
| 2006/0030442 A1* | 2/2006 | Hubertus Maria van Rooij et al. | .............. 474/215 |

FOREIGN PATENT DOCUMENTS

| JP | A-2006-170365 | 6/2006 |
|---|---|---|
| JP | A-2006-214554 | 8/2006 |
| JP | A-2007-255544 | 10/2007 |
| JP | A-2008-39067 | 2/2008 |
| JP | A-2008-202674 | 9/2008 |
| JP | A-2009-115233 | 5/2009 |

OTHER PUBLICATIONS

Feb. 22, 2013 Extended European Search Report issued in European Patent Application No. 10813692.0.

* cited by examiner

TORQUE TRANSMISSION CHAIN AND TORQUE TRANSMISSION DEVICE

TECHNICAL FIELD

The invention relates to a torque transmission chain and, more particularly, to a torque transmission chain and torque transmission device that are suitable for a continuously variable transmission (CVT) of a vehicle, such as an automobile.

BACKGROUND ART

There is suggested a torque transmission chain used in a continuously variable transmission for an automobile in Patent Document 1. The torque transmission chain includes a plurality of links each having front and rear insertion portions, through which pins are inserted, and a plurality of first pins and a plurality of second pins that are arranged one behind the other and that couple the links arranged in the chain widthwise direction such that the front insertion portion of one of the links corresponds to the rear insertion portion of another one of the links, the first pins and the second pins relatively move in rolling contact with each other to thereby allow the links to bend in the longitudinal direction.

In the torque transmission chain of Patent Document 1, the pins repeatedly reciprocate within a preset bending range while being in rolling contact with each other with the transition of the chain from the straight portion to the curved portion or the transition from the curved portion to the straight portion, and the links mutually bend accordingly. When the torque transmission chain is used in a continuously variable transmission, the links may exceed (overshoot) the preset bending range because of a variation or shift in input torque, and the overshooting causes deformation of the links or an increase in noise.

Then, Patent Document 2 suggests that, in such a torque transmission chain, each link has pin contact portions (referred to as "lock points" in this specification) that contact with the corresponding first pin and the corresponding second pin to regulate the maximum relative rotation angle between the links such that the angle formed between the links does not increase beyond a predetermined angle.

RELATED ART DOCUMENT

Patent Document

Patent Document 1: Japanese Patent Application Publication No. 2008-39067
Patent Document 2: Japanese Patent Application Publication No, 2007-255544

SUMMARY OF THE INVENTION

Problems to be Solved by the Invention

In a torque transmission chain used in a continuously variable transmission for an automobile, it is a challenge to improve durability by increasing the strength of each link. For this purpose, in the technique described in the above Patent Document 1, the strength of each link is improved by devising the link shape, and, in addition, in the technique described in the above Patent Document 2, the strength of each link is improved in such a manner that the angle formed between the links does not increase beyond the predetermined angle.

It is still an important challenge to further improve the strength of each link; however, there are restrictions on dimensions, so there is a limit to increase the strength by changing the link shape as in the case of Patent Document 1. Then, to achieve this challenge, attention has been focused on the lock points that regulate the maximum relative rotation angles described in the above Patent Document 2.

One of objects of the invention is to provide a torque transmission chain and torque transmission device of which the strength of links is increased by devising lock points that regulate the maximum relative rotation angle between the links.

Means for Solving the Problems

A torque transmission chain according to an aspect of the invention includes: a plurality of links each having front and rear insertion portions through which pins are inserted; and a plurality of first pins and a plurality of second pins that are arranged one behind the other and that couple the links arranged in a chain widthwise direction such that the front insertion portion of one of the links corresponds to the rear insertion portion of another one of the links, wherein the first pins and the second pins relatively move in rolling contact with each other to thereby allow the links to bend in a longitudinal direction of the links, and each link has lock points that contact with the corresponding first pins and the corresponding second pins to regulate a maximum relative rotation angle between the links, for predetermined ones of the links, the lock points are provided at four portions in total, that is, front and rear surfaces of a link outline portion and front and rear surfaces of a link intermediate pillar portion between the front and rear insertion portions, and each of allowable maximum relative rotation angles regulated by the lock points of the link outline portion is set so as to be smaller than each of allowable maximum relative rotation angles regulated by the lock points of the link intermediate pillar portion.

With this configuration, the lock points that contact with the corresponding first pins and the corresponding second pins to regulate the maximum relative rotation angles are provided at four portions, that is, the front and rear surfaces of the link outline portion and the front and rear surfaces of the intermediate pillar portion between the front and rear insertion portions of each link, so an overshoot is prevented and, furthermore, each of the allowable maximum relative rotation angles regulated by the lock points of the link outline portion is set so as to be smaller than each of the allowable maximum relative rotation angles regulated by the lock points of the link intermediate pillar portion, so the size of each of the lower portions of the front and rear pillar portions of each link may be increased. By so doing, the strength of each link improves, and it is possible to improve the durability of each link.

EMBODIMENTS OF THE INVENTION

Hereinafter, an embodiment of the invention will be described with reference to the drawings. In the following description, upper and lower sides mean the upper and lower sides of FIG. 2.

Figure 1:
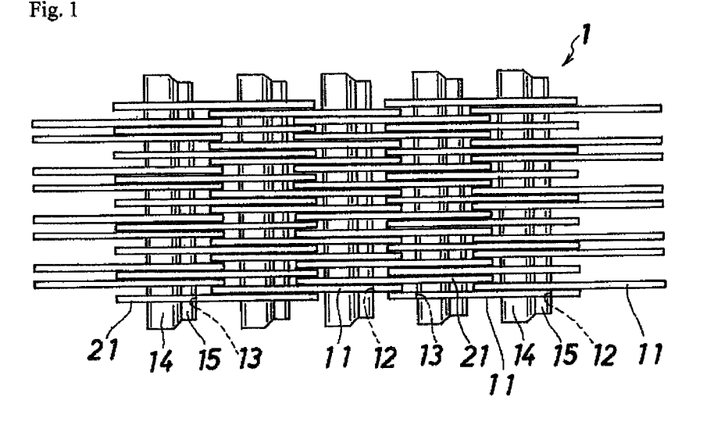
FIG. 1 is a plan view that shows part of one embodiment of a torque transmission chain according to the invention.

FIG. 1 shows part of a torque transmission chain according to the invention. The torque transmission chain 1 includes a plurality of links 11 and 21 each having front and rear insertion portions 12 and 13 provided at a predetermined interval in the chain longitudinal direction and a plurality of pins (first pins) 14 and interpieces (second pins) 15 that couple the links 11 and 21 arranged in the chain widthwise direction so as to be bendable in the longitudinal direction. The interpieces 15 are shorter than the pins 14. Both face each other in a state where each interpiece 15 is arranged on the front side and a corresponding one of the pins 14 is arranged on the rear side.

The chain 1 is formed in such a manner that three link rows, each of which is formed of a plurality of links having the same phase in the widthwise direction, are arranged in a travelling direction (front-rear direction) to form a single link unit and then a plurality of the link units, each of which is formed of the three link rows, are coupled in the travelling direction. In this embodiment, a link row formed of nine links and two link rows each formed of eight links form a single link unit.

In the torque transmission chain 1, two types, that is, short links 11 and long links 21 (described later), are used as the links 11 and 21. For the pins 14, although detailed description is omitted, for example, the small-offset pins 14 of which the contact position of a pin end surface with a pulley 2 is close to a pin center and the large-offset pins 14 of which the contact position of a pin end surface with the pulley is farther from the pin center are used.

Figure 2:
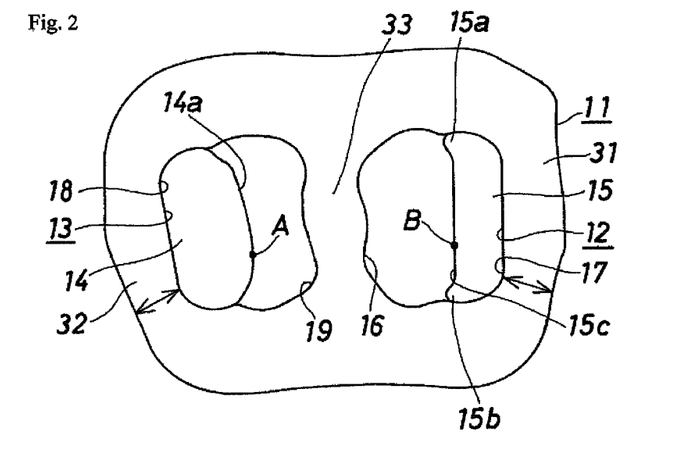
FIG. 2 is an enlarged side view that shows the standard shapes of a link, pin and interpiece.

As shown in FIG. 2, the front insertion portion 12 of each short link 11 (the same applies to each long link 21) is formed of a pin movable portion 16 to which the pin 14 is movably fitted and an interpiece fixing portion 17 to which the interpiece 15 is fixed, and the rear insertion portion 13 is formed of a pin fixing portion 18 to which the pin 14 is fixed and an interpiece movable portion 19 to which the interpiece 15 is movably fitted.

Each of the links 11 and 21 has a front pillar portion 31 for forming the front surface shape of the front insertion portion 12, a rear pillar portion 32 for forming the rear surface shape of the rear insertion portion 13, and an intermediate pillar portion 33 between the front insertion portion 12 and the rear insertion portion 13.

As shown in FIG. 2, portions indicated by the reference signs A and B are lines (points in cross section) at which the pin 14 and the interpiece 15 contact in a straight region of the chain 1, and the distance between A and B is a pitch length. The pitch length is different between the short link 11 and the long link 21.

Each pin 14 has a width wider in the front-rear direction than that of the interpiece 15, and protruding edge portions 15a and 15b that extend toward the pin 14 are provided at the upper and lower edge portions of the interpiece 15.

In order to couple the links 11 and 21 arranged in the chain widthwise direction, the links 11 and 21 are overlapped with each other in such a manner that the front insertion portion 12 of one of the links 11 and 21 corresponds to the rear insertion portion 13 of another one of the links 11 and 21, the pin 14 is fixed to the rear insertion portion 13 of one of the links 11 and 21 and is movably fitted to the front insertion portion 12 of another one of the links 11 and 21, and the interpiece 15 is movably fitted to the rear insertion portion 13 of one of the links 11 and 21 and is fixed to the front insertion portion 12 of another one of the links 11 and 21. Then, the pins 14 and the interpieces 15 relatively move in rolling contact with each other to thereby allow the links 11 and 21 to bend in the longitudinal direction (front-rear direction).

The trajectory of the contact position between each pin 14 and a corresponding one of the interpieces 15 with reference to the pin 14 forms an involute of circle. In this embodiment, the rolling contact surface 14a of the pin 14 forms an involute curve that has a base circle of a radius Rb and a center M in cross section, and the rolling contact surface 15c of the interpiece 15 forms a flat surface (straight line in sectional shape). By so doing, at the time of the transition of each of the links 11 and 21 from the straight region of the chain 1 to the curved region of the chain 1 or the transition from the curved region to the straight region, in the front insertion portion 12, the pin 14 moves within the pin movable portion 16 with respect to the fixed interpiece 15 while the rolling contact surface 14a of the pin 14 is in rolling contact (including slight sliding contact) with the rolling contact surface 15c of the interpiece 15, and, in the rear insertion portion 13, the interpiece 15 moves within the interpiece movable portion 19 with respect to the fixed pin 14 while the rolling contact surface 15c is in rolling contact (including slight sliding contact) with the rolling contact surface 14a of the pin 14.

In the torque transmission chain 1, polygonal vibration occurs because of repeated up and down movement of the pins, and this becomes a factor of noise; however, each pin 14 and a corresponding one of the interpieces 15 move relatively in rolling contact with each other, and the trajectory of the contact position between the pin 14 and the interpiece 15 with reference to the pin 14 forms an involute of circle, so, in comparison with the case where both the contact surfaces of the pin and interpiece are circular arc surfaces, or the like, vibration may be reduced, and noise may be reduced.

Figure 3:
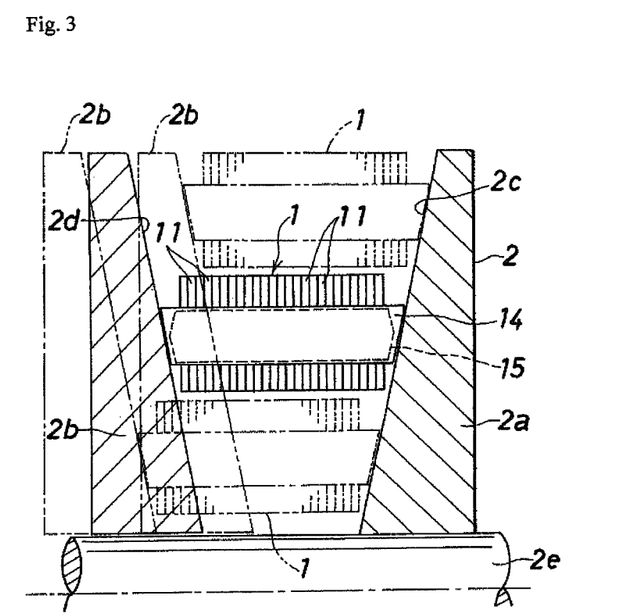
FIG. 3 is a front view that shows a state where the torque transmission chain is assembled to a pulley.

The torque transmission chain 1 is used in a V-type pulley CVT. In this case, as shown in FIG. 3, in a state where the end surfaces of the interpieces 15 are not in contact with the conical sheave surfaces 2c and 2d of fixed sheave 2a and movable sheave 2b of a pulley 2 having a pulley shaft 2e, the end surfaces of the pins 14 are in contact with the conical sheave surfaces 2c and 2d of the pulley 2, and torque is transmitted by friction force based on this contact.

As the movable sheave 2b of the drive pulley 2, which is located at the position indicated by continuous line, is brought close to or away from the fixed sheave 2a, the winding diameter of the drive pulley 2 is large at the time when the movable sheave 2b is brought close to the fixed sheave 2a and is small at the time when the movable sheave 2b is brought away from the fixed sheave 2a as indicated by the dotted line in the drawing. Although not shown in the drawing, in a driven pulley, the movable sheave moves in a direction opposite to the movable sheave 2b of the drive pulley 2. As the winding diameter of the drive pulley 2 increases, the winding diameter of the driven pulley reduces; whereas, as the winding diameter of the drive pulley 2 reduces, the winding diameter of the driven pulley increases. As a result, with reference to a state where the speed ratio is 1:1 (initial value), an U/D (under drive) state where the winding diameter of the drive pulley 2 is minimal and the winding diameter of the driven pulley is maximal is obtained, and an O/D (over drive) state where the winding diameter of the drive pulley 2 is maximal and the winding diameter of the driven pulley is minimal is obtained.

In order to further reduce noise and vibration, it is desirable that two or more different links 11 and 21 having different pitch lengths or two or more different pins 14 having different sectional shapes or end surface shapes are randomly arranged. By so doing, the period of occurrence of hitting noise deviates, the energy of sound is distributed among different frequency bands, and the peak of sound pressure level is reduced.

Figure 7:
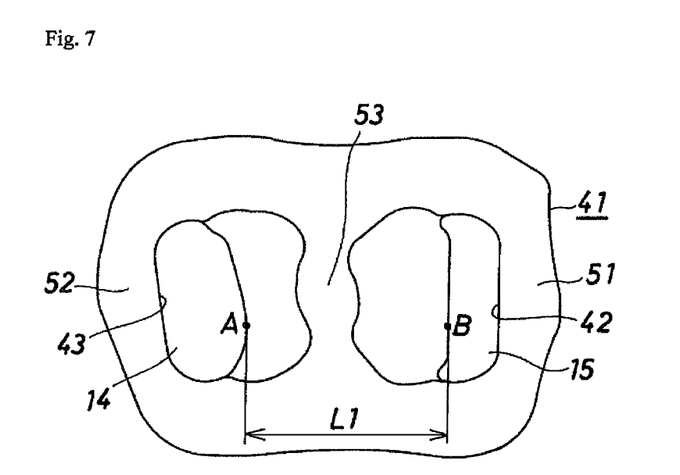
FIG. 7 is an enlarged side view that shows the shape of a short link in an existing torque transmission chain.

FIG. 7 shows an existing short link 41 that corresponds to the short link 11 according to the invention shown in FIG. 2. Although the short link 41 differs in detailed shape from the one shown in FIG. 2, the basic shape is the same. The short link 41 has a front insertion portion 42, a rear insertion portion 43, a front pillar portion 51 for forming the front surface shape of the front insertion portion 42, a rear pillar portion 52 for forming the rear surface shape of the rear insertion portion 43 and an intermediate pillar portion 53 between the front insertion portion 42 and the rear insertion portion 43, and its pitch length (distance between A and B) is set to L1.

Figure 8:
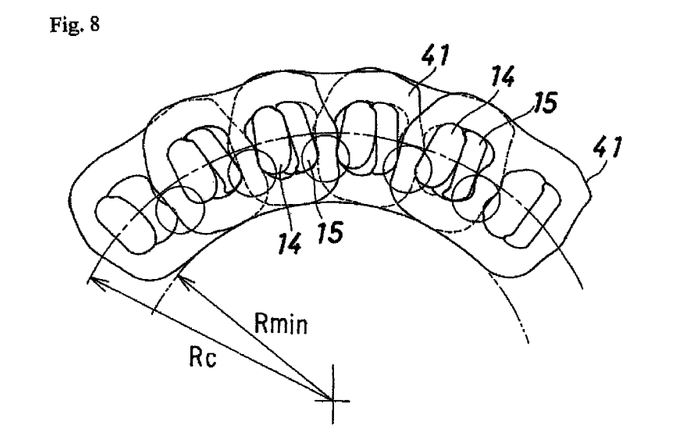
FIG. 8 is a side view that shows a bent state of short links in the existing torque transmission chain.

Then, as shown in FIG. 8, when the short links 41 are successively coupled and these are wound around the pulley 2 to bend, lock points that contact the corresponding pins 14 and interpieces 15 to regulate the maximum relative rotation angles are provided at portions indicated by the circles in the drawing such that the angle formed between the links 41 does not increase beyond the predetermined angle.

Figure 9:
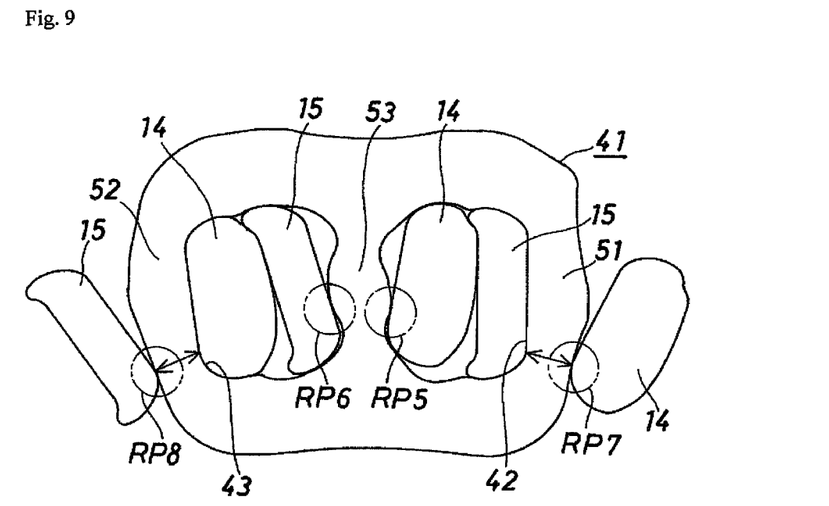
FIG. 9 is a view that shows lock points at a short link successive portion of the existing torque transmission chain.

FIG. 9 is an enlarged view that extracts and shows only the short link 41, the pins 14 and the interpieces 15 relevant to lock points. In the short link 41 shown in the drawing, the front surface of the intermediate pillar portion 53 is in contact with the lower portion of the pin 14 that rolls within the front insertion portion 42, and the rear surface of the intermediate pillar portion 53 is in contact with the lower portion of the interpiece 15 that rolls within the rear insertion portion 43. Furthermore, the front surface of the lower portion of the front pillar portion 51 is in contact with the lower portion of the pin 14 that rolls within the front insertion portion 42 of the link 41 located two links ahead, and the rear surface of the lower portion of the rear pillar portion 52 is in contact with the lower portion of the interpiece 15 that rolls within the rear insertion portion 43 of the link 41 located two links behind.

In this way, the lock point RP5 of the front surface of the intermediate pillar portion 53, the lock point RP6 of the rear surface of the intermediate pillar portion 53, the lock point RP7 of the front surface of the link outline portion (front pillar portion) 51 and the lock point RP8 of the rear surface of the link outline portion (rear pillar portion) 52, that is, the four lock points RP5, RP6, RP7 and RP8 in total are provided. In these lock points RP5, RP6, RP7 and RP8, the short link 41 and the pins 14 and interpieces 15 are configured to be in contact with each other at the same time (the lock points RP5 and RP6 of the link intermediate pillar portion 53 and the lock points RP7 and RP8 of the link outline portion respectively correspond to the same relative rotation angles), and these lock points RP5, RP6, RP7 and RP8 prevent further bending between the links 41.

By so doing, at the time of the transition from the straight portion of the chain 1 to the circular arc portion of the chain 1 or the transition from the circular arc portion to the straight portion, occurrence of indentation or friction mark, which becomes the origin of crack, resulting from hard contact of the pin 14 or interpiece 15 on the peripheral surfaces of the front and rear insertion portions 42 and 43 of the link 41 because of overshooting is suppressed, so the link service life improves.

Figure 10:
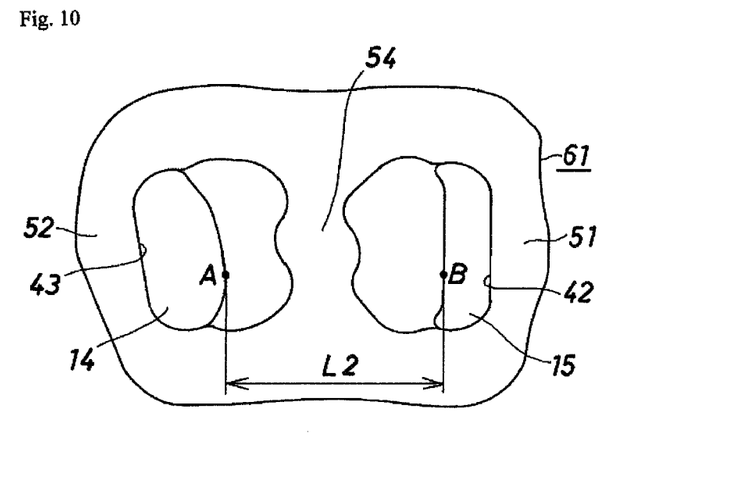
FIG. 10 is an enlarged side view that shows the shape of a long link in the existing torque transmission chain.

FIG. 10 shows a long link 61 that is associated with the short link 41 shown in FIG. 7. The long link 61 is formed to have a pitch length that is L2 larger than L1 of the short link in such a manner that the length in the front-rear direction of the intermediate pillar portion 54 of the long link 61 is larger than the intermediate pillar portion 53 of the short link 41.

Figure 11:
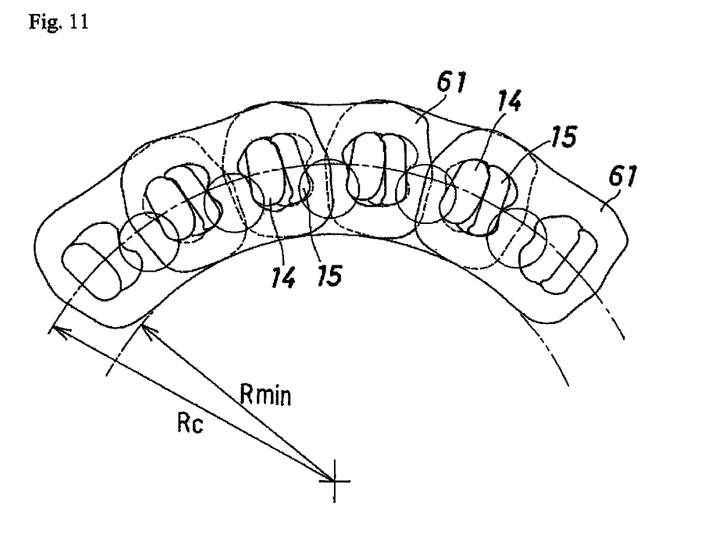
FIG. 11 is a view that shows lock points at a long link successive portion of the existing torque transmission chain.

FIG. 11 shows a long link successive portion in which the short links 41 shown in FIG. 8 are replaced with the long link 61 shown in FIG. 10. In the long link successive portion, as compared with the short link successive portion of which the effective rotation radius Re is small and the minimum radius Rmin is small, the effective rotation radius Re is large and the minimum radius Rmin is large, and the lock points indicated by circles in FIG. 11 are set at two portions in total, which correspond to the lock point RP5 of the front surface of the intermediate pillar portion 53 and the lock point RP6 of the rear surface of the intermediate pillar portion 53 in FIG. 9.

In the short link successive portion shown in FIG. 8 and the long link successive portion shown in FIG. 11, both allowable maximum relative rotation angles are set to 18 degrees, and, in any cases, the effective rotation radius Re and the minimum radius Rmin of the link lower portion are set to have a sufficient margin in consideration of random.

Note that the portions indicated by the arrows in FIG. 9 are portions of the front and rear pillar portions 51 and 52, which are formed in required shapes in order to form the lock points RP7 and RP8, and, as the sizes of these portions increase, the compression stress of the link 41 may be increased, and it is advantageous in improving the durability of the link 41.

However, increasing the size of the link 41 overall is restricted on dimensions, and it is difficult to increase the sizes of the portions indicated by the arrows in FIG. 9. The invention focuses attention on the lock points to devise the lock points as will be described later to increase the sizes of the portions indicated by the arrows in FIG. 9 to thereby achieve the challenge of improving the strength of each link.

In order to achieve the challenge, first, random arrangement that includes the short link successive portion, and the like, shown in FIG. 8 was analyzed as to how the maximum relative rotation angles change, and, in consideration of the facts that the allowable maximum relative rotation angles of the link outline portion depend on the degree of random and, in addition, the condition that the number of the successive long links is at most two as the case now stands is satisfied, it was examined whether the sizes of the front and rear pillar portions 51 and 52 of each link 41 may be increased.

The maximum relative rotation angles vary depending on whether the short links 41 are successive or whether the long links 61 are successive, and, in addition, vary depending on how the shape of each pin 14 is formed. Through the analysis, in the embodiment of random arrangement, which is targeted by the invention, it was found that each of the maximum relative rotation angles is smaller than or equal to 17 degrees. When taking the elastic and plastic deformation of the links 41 and 61 into consideration, it is appropriate that a margin of 0.5 to 1 degree is provided for each maximum relative rotation angle set for the actual chain 1, and the lock points of the link outline portion just require that the sum of a pair of the successive relative rotation angles, including the margin, is smaller than or equal to 18 degrees×2=36 degrees. Note that it is necessary to verify that there are no portions at which the relative rotation angles are successively large even when random is added.

According to the result of analysis, it may be determined that the link outline portion (front and rear pillar portions 51 and 52) may be reduced in relative rotation angle as compared with the link intermediate pillar portion 53. Such an idea is not suggested conventionally and is a breakthrough in terms of design.

The short link 11 shown in FIG. 2 is an improved product based on the analysis. The short link 11 is designed such that the front and rear insertion portions 12 and 13 are minimal and the front pillar portion 31 and the rear pillar portion 32 are maximal, and each of the maximum relative rotation angles of the link outline portion 31 and 32 is smaller than each of the allowable maximum relative rotation angles of the intermediate pillar portion 33. By so doing, the sizes of the portions indicated by the arrows in FIG. 2 are increased.

Figure 4:
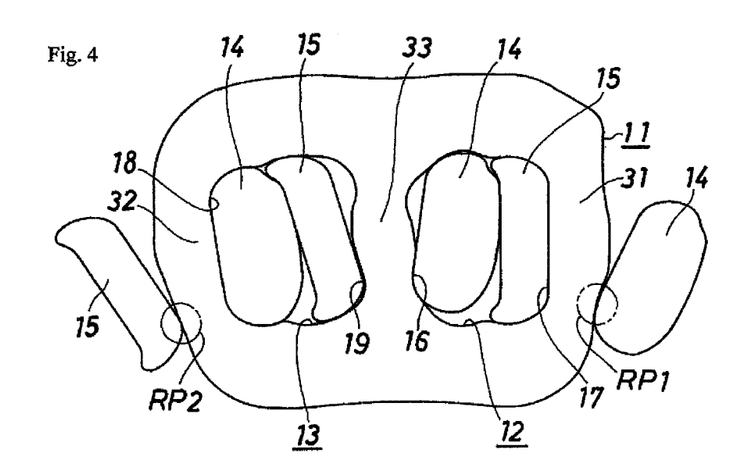
FIG. 4 is a view that shows lock points of a link outline portion in the torque transmission chain according to the invention.
Figure 5:
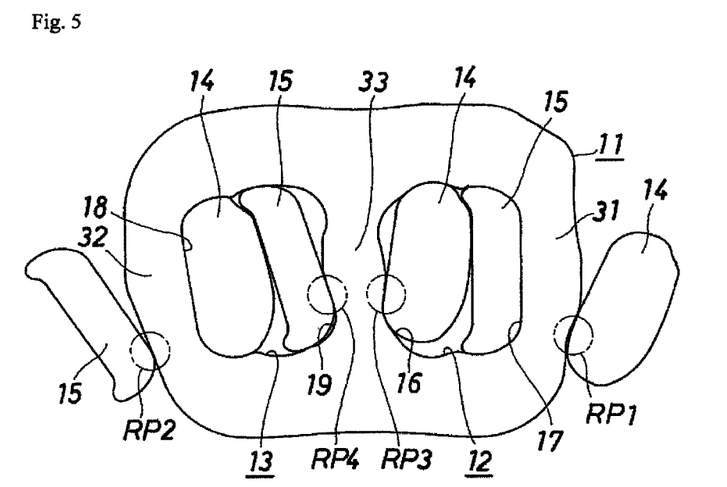
FIG. 5 is a view that shows lock points of a link intermediate pillar portion in the torque transmission chain according to the invention.

FIG. 4 and FIG. 5 correspond to FIG. 9 that shows the existing lock points, and show lock points RP1, RP2, RP3 and RP4 in a state where five elements of only the short links 11 are successive.

In FIG. 4, each of the relative rotation angles is 17 degrees (about 16.8 degrees at the time of design) that is smaller than that (18 degrees) of FIG. 9, and, in these short links 11, the front surface of the lower portion of the front pillar portion 31 contacts with the lower portion of the pin 14 that rolls within the front insertion portion 12 of the link 11 located two links ahead, and the rear surface of the lower portion of the rear pillar portion 12 contacts with the lower portion of the interpiece 15 that rolls within the rear insertion portion 13 of the link 11 located two links behind. That is, the lock points at this phase are only two portions in total, that is, the lock point RP1 of the front surface of the link outline portion (front pillar portion) 31 and the lock point RP2 of the rear surface of the link outline portion (rear pillar portion) 32, and, at this time, the front surface and rear surface of the intermediate pillar portion 33 have not yet reached the lock points.

In FIG. 5, each relative rotation angle is set to 17.5 degrees smaller than that (18 degrees) in FIG. 9 and larger than that in FIG. 4. Then, at this time, in addition to the lock points RP1 and RP2 shown in FIG. 4, the front surface of the intermediate pillar portion 33 contacts with the lower portion of the pin 14 that rolls within the front insertion portion 12, and the rear surface of the intermediate pillar portion 33 contacts with the lower portion of the interpiece 15 that rolls within the rear insertion portion 13, so the lock point RP3 of the front surface of the intermediate pillar portion 33 and the lock point PR4 of the rear surface of the intermediate pillar portion 33 are added. By so doing, an overshoot beyond the allowable maximum relative rotation angles regulated by the lock points RP3 and RP4 of the intermediate pillar portion 33 is reliably prevented.

In this way, the intermediate pillar portion of the link is regulated at the portions at which the maximum relative rotation angle occurs, and, at this time, by utilizing the fact that the pair of adjacent relative rotation angles do not reach twice of 16.8 degrees in total (in consideration of the margin of about 0.5 degrees each), it is possible to reduce the allowable maximum relative rotation angles of the link outline portion.

That is, on the basis of the result of the above random analysis, in the torque transmission chain according to the invention, different relative rotation angles respectively correspond to the lock points RP1 and RP2 of the link outline portion 31 and 32 and the lock points RP3 and RP4 of the link intermediate pillar portion 33, each of the allowable maximum relative rotation angles regulated by the lock points RP1 and RP2 of the link outline portion 31 and 32 is smaller than each of the allowable maximum relative rotation angles regulated by the lock points RP3 and RP4 of the link intermediate pillar portion 33, and the difference therebetween is larger than or equal to 0.5 degrees.

Figure 6:
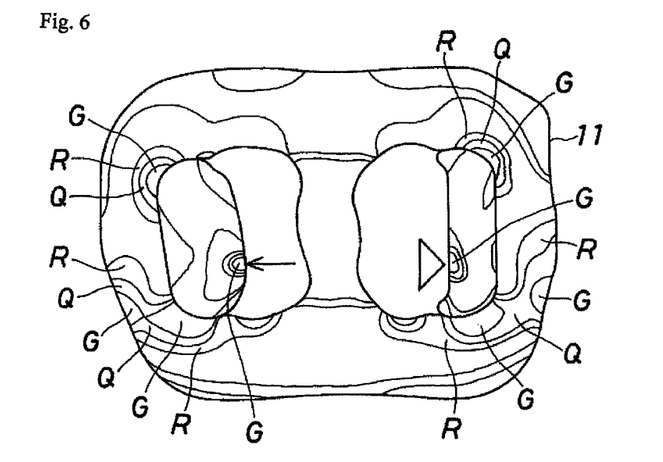
FIG. 6 is a view that shows a stress condition at the time when a pretension is applied to the links in the torque transmission chain according to the invention.

In order to obtain the above lock points RP1, RP2, RP3 and RP4, it is necessary to increase the length of each of the portions indicated by the arrows in FIG. 2. On the basis of this, FIG. 6 shows a stress condition at the time when a pretension is loaded to add residual stress to the lower portions of the link 11, to which the pin 14 and the interpiece 15 are press-fitted and of which the sizes of the front pillar portion 31 and rear pillar portion 32 are increased. In the drawing, the portions indicated by G are regions in which stress is larger than or equal to link yield stress, the stress of each of the regions indicated by Q surrounding G is smaller than that, and the stress of each of the regions indicated by R is further smaller than that. As the elastic limit of the link 11 extends through the front pillar portion 31 and the rear pillar portion 32, the link 11 extremely elongates, so the pretension becomes an appropriate pretension before and after extending through a plastic range, and it is found that the front pillar portion 31 and the rear pillar portion 32, particularly, the length of each of the lower portions of them in the directions indicated by the arrows in FIG. 2, is increased to thereby make it possible to increase an allowable pretension. By so doing, it is possible to improve the durability of the link 11.

In the above torque transmission chain, the existing pin shape and link pitch are not required to change, and it is possible to increase the chain strength without large design changes. Note that in the existing one in which the four lock points are brought into contact at the same time as well, the design maximum relative rotation angles are reduced to make it possible to improve the strength of each link; however, there is a limit for this configuration, and, in this invention, each of the allowable maximum relative rotation angles regulated by the lock points RP1 and RP2 of the link outline portion 31 and 32 is smaller than each of the allowable maximum relative rotation angles regulated by the lock points RP3 and RP4 of the link intermediate pillar portion 33 to thereby make it possible to exceedingly increase the effect of improving the strength of each link 11.

Note that the long link to be combined with the above short link 11 may be formed such that the front-rear length of the intermediate pillar portion 33 is increased with reference to the short link 11 to increase the pitch length; however, the long link is not limited to this configuration, and the long link may be modified so as to obtain appropriate lock points by referring to the above result of analysis. In addition, the links having different pitch lengths and pins having different shapes are arranged randomly, so there are various combinations, and the shapes of the front and rear pillar portions and/or intermediate pillar portion of each link may be varied for each combination.

A torque transmission chain according to an embodiment of the invention includes: a plurality of links each having front and rear insertion portions through which pins are inserted; and a plurality of first pins and a plurality of second pins that are arranged one behind the other and that couple the links arranged in a chain widthwise direction such that the front insertion portion of one of the links corresponds to the rear insertion portion of another one of the links, wherein the first pins and the second pins relatively move in rolling contact with each other to thereby allow the links to bend in a longitudinal direction of the links, and each link has lock points that contact with the corresponding first pins and the corresponding second pins to regulate a maximum relative rotation angle between the links, for predetermined ones of the links, the lock points are provided at four portions in total, that is, front and rear surfaces of a link outline portion and front and rear surfaces of a link intermediate pillar portion between the front and rear insertion portions, and each of allowable maximum relative rotation angles regulated by the lock points of the link outline portion is set so as to be smaller than each of allowable maximum relative rotation angles regulated by the lock points of the link intermediate pillar portion.

An angle formed between the links, that is, a relative rotation angle, may be, for example, obtained as an angle formed between straight lines, each of which defines the pitch length of a corresponding one of the links. Normally, the links are fixed at predetermined positions of the pins, so the relative rotation angle between the links may be obtained as an angle formed between the pins.

At the time of the transition from the straight portion of the chain to the curved portion of the chain or the transition from the curved portion to the straight portion, one of the pins moves with respect to the other one of the pins while being in rolling contact with each other, the contact position between the pins moves to vary the relative rotation angle between the pins, and, accordingly, the relative rotation angle between the adjacent links also varies. Contact between the pins is line contact (point contact in cross section of the pins) along the longitudinal direction of the pins. In a chain for a continuously variable transmission, or the like, as torque applied to the chain varies or the chain speed is varied, inertial force, or the like, fluctuates, and the links or the pins may overshoot beyond preset relative rotation angles. Such an overshoot is prevented by the lock points (in such a manner that predetermined positions of each link contact and interfere with predetermined positions of the corresponding first pins and second pins to block further movement of the link and the pins). By so doing, deformation of the links and occurrence of noise are suppressed.

When there are a plurality of types of the link shapes, the above lock points are provided at four portions for each reference link (for example, each larger number one of the links). The other links just need to be provided with lock points at least at two portions. The four lock points are respectively provided at four portions in total, that is, the front and rear surfaces of the link outline portion and the front and rear surfaces of the intermediate pillar portion between the front and rear insertion portions of the link.

In the idea of the existing lock points, the lock points at four portions all are set so as to lock at the time of the same allowable maximum relative rotation angle; however, in the torque transmission chain according to the embodiment of the invention, each of the allowable maximum relative rotation angles of the link outline portion is set so as to be smaller than each of the allowable maximum relative rotation angles of the link intermediate pillar portion. Owing to the setting, the size of the lower portion of each of the front and rear pillar portions of each link, which cannot be increased in size conventionally, may be increased, and, by so doing, the strength of each link improves.

For the links and the pins, it is desirable that the links having different pitch lengths and the pins having different pin shapes are combined and arranged randomly. The pitch is the distance from the contact position between the first pin and the second pin in the front insertion portion to the contact position between the first pin and the second pin in the rear insertion portion, and, for example, the shapes of the front and rear insertion portions remain unchanged while the gap therebetween (the front-rear length of the intermediate pillar portion) is varied to thereby make it possible to obtain the links having different pitches (short links and long links). The pin shape may be, for example, varied in offset, and may be, for example, increased or reduced in curvature of the rolling contact surface or varied in length. The rolling contact surface of any one of the first pin and the second pin is usually formed as a flat surface, and the other rolling contact surface is formed as an involute curved surface that is relatively movable while being in rolling contact. However, the contact surfaces of the first and second pins may be respectively formed in a required curved surface.

The links having two types of pitch lengths are provided, so the period of occurrence of hitting sound deviates, and the peak of sound pressure level is reduced. The offset and length of each pin are set in two levels to set the two-level positions at which the pins contact with the pulley, so the peak of sound pressure level is reduced. In addition, for the rolling contact surface shapes of the first and second pins, the trajectory of the contact position between the first pin and the second pin forms an involute curve and the radius of the base circle of the involute is set in two levels, so the peak of sound pressure level is reduced.

When the links having different pitch lengths and the pins having different pin shapes are randomly arranged in combination, the maximum relative rotation angles vary on the basis of not only the pitch length but also the pin shape. As the maximum relative rotation angles reduce, the size of the link outline portion (front and rear pillar portions) may be further increased, so it is applicable that random arrangement is employed but the arrangement is partially regulated to thereby eliminate a portion at which the maximum relative rotation angle is partially large.

For example, it is desirable that the plurality of links include long links having a relatively long pitch length and short links having a relatively short pitch length, these are randomly arranged, and at most two of the long links are successively arranged in the chain travelling direction. By so doing, irrespective of the pin shape, it is possible to regulate the maximum relative rotation angle.

Note that the lock points are provided with reference to each short link, each long link may be formed to have a shape different only in the length of the intermediate pillar portion from each short link with the same allowable maximum relative rotation angles as those of each short link and may not be provided with lock points at the outline portion thereof to thereby prevent an overshoot only by the lock points of the intermediate pillar portion. By so doing, each long link may have a simple shape; however, the shape of each long link is not limited to this shape. Each long link may have allowable maximum relative rotation angles different from those of each short link. In addition, the allowable maximum relative rotation angles of the intermediate pillar portion of each link may be varied on the basis of the pitch length. The difference between each of the allowable maximum relative rotation angles of the link outline portion and each of the allowable maximum relative rotation angles of the link intermediate pillar portion is, for example, set to about 0.5 degrees; however, it is not limited to this configuration.

It is desirable that one of the first pin and the second pin is fixed to a pin fixing portion provided at a front portion of the front insertion portion of one of the links and is movably fitted to a pin movable portion provided at a front portion of the rear insertion portion of another one of the links, and the other one of the first pin and the second pin is movably fitted to a pin movable portion provided for a rear portion of the front insertion portion of the one of the links and is fixed to a pin fixing portion provided at a rear portion of the rear insertion portion of another one of the links.

Fixing the pins to the corresponding pin fixing portions is, for example, such that the inner periphery of the pin fixing portion is fixedly fitted to the outer peripheral surface of the pin by mechanical press-fitting; instead, it may be performed by shrinkage fitting or expansion fitting. Fitting for fixing is desirably set at edges (upper and lower edges) of a portion perpendicular to the longitudinal direction of the pin fixing portion. After the fitting for fixing, a pretension is applied in a pretension applying step to thereby uniformly apply appropriate residual compression stress to the pin fixing portion (pin press-fitting portion) of the link.

In the torque transmission chain according to the embodiment of the invention, at least one of the first pin and the second pin contacts with the pulley to transmit torque by friction force. In the chain in which any one of the pins contacts with the pulley, any one of the first pin and the second pin serves as the pin (hereinafter, referred to as "first pin" or "pin") that contacts with the pulley when the chain is used in a continuously variable transmission, and the other one serves as the pin (referred to as interpiece or strip, and, hereinafter, referred to as "second pin" or "interpiece") that does not contact with the pulley.

Each link is, for example, made of spring steel or carbon tool steel. The material of each link is not limited to spring steel or carbon tool steel; of course, it may be another steel, such as bearing steel. An appropriate steel, such as bearing steel, is used as the material of each pin.

Note that in this specification, one end side of each link in the longitudinal direction is defined as a front side and the other end side is defined as a rear side; however, the front side and rear side are used for descriptive purposes, and it does not mean that the longitudinal direction of each link always coincides with the front-rear direction.

The above torque transmission chain is desirably configured such that any one of the pins (interpiece) is shorter than the other one of the pins (pin), an end surface of the longer one of the pins is in contact with the conical sheave surfaces of the pulley of the continuously variable transmission and torque is transmitted by friction force due to the contact. Each pulley is formed of a fixed sheave having a conical sheave surface and a movable sheave having a conical sheave surface facing the sheave surface of the fixed sheave, the chain is held between the sheave surfaces of both the sheaves, the movable sheave is moved by a hydraulic actuator, so the winding radius of the chain varies with the distance between the sheave surfaces of the continuously variable transmission to thereby make it possible to continuously shift the speed with smooth movement.

A torque transmission device according to an embodiment of the invention includes: a first pulley having a conical sheave surface; a second pulley having a conical sheave surface; and a torque transmission chain that is wound between these first and second pulleys, and the torque transmission chain is the one described above.

DESCRIPTION OF REFERENCE NUMERALS 1 torque transmission chain
2 pulley
2a, 3b fixed sheave
2b, 3a movable sheave
2c, 2d conical sheave surface
11 short link
12 front insertion portion
13 rear insertion portion
14 pin (first pin)
15 interpiece (second pin)
21 long link
RP1, RP2, RP3 and RP4 lock point

The invention claimed is:

1. A torque transmission chain that includes:
a plurality of links, each link having (i) a front insertion portion and (ii) a rear insertion portion, pins being inserted through the front insertion portion and the rear insertion portion, (iii) a link intermediate pillar portion formed between the front insertion portion and the rear insertion portion, and (iv) a link outline portion which forms an outer surface of the link; and
a plurality of first pins and a plurality of second pins, the plurality of first pins and the plurality of second pins are arranged one behind the other and couple the links arranged in a chain widthwise direction such that the front insertion portion of one of the links corresponds to the rear insertion portion of another one of the links, wherein the first pins and the second pins relatively move in rolling contact with each other to thereby allow the links to bend in a longitudinal direction of the links, and each link has lock points that contact with the corresponding first pins and the corresponding second pins to regulate a maximum relative rotation angle between the links, wherein:
at least one of the plurality of links has the lock point at each of (a) a front surface of the link outline portion, (b) a rear surface of the link outline portion, (c) a front surface of the link intermediate pillar portion, and (d) a rear surface of the link intermediate pillar portion, and
each of allowable maximum relative rotation angles regulated by the lock points of the link outline portion is set so as to be smaller than each of allowable maximum relative rotation angles regulated by the lock points of the link intermediate pillar portion.

2. The torque transmission chain according to claim 1, wherein the plurality of links include (1) first links each having a first pitch length and (2) second links each having a second long pitch length which is longer than the first pitch length, and at most two of the second links are successively arranged in a chain travelling direction.

3. A power transmission device comprising:
a first pulley having a conical sheave surface;
a second pulley having a conical sheave surface; and
the torque transmission chain according to claim 2, which is wound between these first and second pulleys.

4. A power transmission device comprising:
a first pulley having a conical sheave surface;
a second pulley having a conical sheave surface; and
the torque transmission chain according to claim 1, which is wound between these first and second pulleys.

* * * * *